US007784501B2

(12) United States Patent
Gershtein et al.

(10) Patent No.: US 7,784,501 B2
(45) Date of Patent: Aug. 31, 2010

(54) EFFICIENT SYSTEM AND METHOD FOR DELIVERY OF PRODUCT AND RETURN OF CARRIER

(75) Inventors: Vladimir Yliy Gershtein, Allentown, PA (US); Karen M. Campbell, Coopersburg, PA (US); Paul Anthony Mattiola, Coopersburg, PA (US); Derek Miller, Emmaus, PA (US); Thomas Joseph, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1120 days.

(21) Appl. No.: 11/398,960

(22) Filed: Apr. 6, 2006

(65) Prior Publication Data

US 2006/0239905 A1    Oct. 26, 2006

Related U.S. Application Data

(60) Provisional application No. 60/707,036, filed on Aug. 10, 2005, provisional application No. 60/669,522, filed on Apr. 8, 2005.

(51) Int. Cl.
*B65B 1/04* (2006.01)
(52) U.S. Cl. .................. 141/100; 141/18; 141/231
(58) Field of Classification Search .............. 141/2, 141/4–7, 18, 94, 100, 231, 232
See application file for complete search history.

(56) References Cited

U.S. PATENT DOCUMENTS 4,211,537 A   7/1980 Teitel (Continued)

FOREIGN PATENT DOCUMENTS

EP    0 003 588    8/1979

(Continued)

OTHER PUBLICATIONS

U.S. Appl. No. 10/430,246, filed May 6, 2003, Pez, Guido Peter, et al.

(Continued)

*Primary Examiner*—Gregory L Huson
*Assistant Examiner*—Jason K Niesz
(74) *Attorney, Agent, or Firm*—Michael K. Boyer

(57) ABSTRACT

Systems and methods are provided for distributing a product, like hydrogen, contained in a carrier to a user, and for recovering the spent from the user. In one embodiment, the invention is a system for distributing a product releasably incorporated within a carrier, recovering spent, and conveying spent to a rehabilitation facility. In this embodiment, the system comprises a mobile delivery vehicle, the vehicle comprising a first storage vessel for storing fresh and for dispensing fresh using a connected fresh dispensing apparatus and for receiving and storing spent from a spent dispensing apparatus, the storage vessel further including means for separating fresh from spent. The system further includes fresh, spent, and a first user. The first user comprises a fresh storage vessel for receiving, storing, and dispensing fresh, and further comprises a first spent storage vessel for receiving, storing, and dispensing spent. The system further includes a fresh dispensing apparatus for linking the first storage vessel and the fresh storage vessel of the first user for dispensing of fresh to the first user, and a spent removal apparatus for linking the first storage vessel and the spent storage vessel of the first user for removal of fresh from the first user for storage in the first storage vessel. Use of a mobile delivery vehicle to deliver fresh and recover spent for rehabilitation from a plurality of users avoids logistic inefficiencies, and reduces potential for contamination and/or loss of product, carrier, fresh, and spent.

16 Claims, 7 Drawing Sheets

U.S. PATENT DOCUMENTS

| | | | |
|---|---|---|---|
| 4,531,656 A | 7/1985 | Nitchman et al. | |
| 5,148,945 A | 9/1992 | Geatz | |
| 5,292,030 A | 3/1994 | Kateman et al. | |
| 5,417,346 A | 5/1995 | Ferri, Jr. et al. | |
| 5,579,233 A | 11/1996 | Burns | |
| 5,758,571 A | 6/1998 | Kateman et al. | |
| 5,803,599 A | 9/1998 | Ferri, Jr. et al. | |
| 5,923,572 A | 7/1999 | Pollock | |
| 5,952,117 A * | 9/1999 | Colborn et al. | 429/27 |
| 5,992,686 A | 11/1999 | Cline et al. | |
| RE36,510 E | 1/2000 | Burns | |
| 6,374,870 B1 | 4/2002 | Muller | |
| 6,382,264 B1 | 5/2002 | Tsai et al. | |
| 6,402,938 B1 | 6/2002 | Moore et al. | |
| 6,536,523 B1 | 3/2003 | Kresnyak et al. | |
| 6,558,825 B1 * | 5/2003 | Faris et al. | 429/17 |
| 6,616,036 B2 | 9/2003 | Streicher et al. | |
| 6,655,155 B2 | 12/2003 | Bishop | |
| 6,745,801 B1 | 6/2004 | Cohen et al. | |
| 6,802,875 B1 | 10/2004 | Kimbara et al. | |
| 6,834,508 B2 | 12/2004 | Bradley et al. | |
| 7,169,489 B2 * | 1/2007 | Redmond | 429/12 |
| 7,226,676 B2 * | 6/2007 | Faris et al. | 429/17 |
| 2003/0108601 A1 | 6/2003 | Chrai et al. | |
| 2003/0206102 A1 | 11/2003 | Joao | |
| 2004/0223907 A1 | 11/2004 | Pez et al. | |
| 2005/0002857 A1 | 1/2005 | Pez et al. | |
| 2005/0090704 A1 | 4/2005 | Roettger et al. | |
| 2006/0060817 A1 * | 3/2006 | Tempel et al. | 252/181.3 |
| 2006/0118201 A1 | 8/2006 | Li et al. | |
| 2006/0226050 A1 | 10/2006 | Gershtein et al. | |
| 2007/0034532 A1 | 2/2007 | Gershtein et al. | |

FOREIGN PATENT DOCUMENTS

| | | |
|---|---|---|
| EP | 0 862 423 | 9/1998 |
| EP | 1 081 780 | 3/2001 |
| EP | 1 081 780 A | 3/2001 |
| JP | 06-100096 A1 | 4/1994 |
| JP | 2001-068138 A1 | 3/2001 |
| JP | 2004-501495 A1 | 1/2004 |
| JP | 2005009062 | 1/2005 |
| JP | 2005-527501 A1 | 9/2005 |
| WO | WO 97/02898 | 1/1997 |
| WO | WO 98/01118 | 1/1998 |
| WO | 01/99222 A | 12/2001 |
| WO | WO 03/061047 | 7/2003 |
| WO | 2004/076945 A1 | 9/2004 |

OTHER PUBLICATIONS

U.S. Appl. No. 10/833,467, filed Apr. 27, 2004, Bagzis, Larry et al.
U.S. Appl. No. 10/833,484, filed Apr. 27, 2004, Pez, Guido Peter et al.
U.S. Appl. No. 10/948,277, filed Sep. 23, 2004, Tempel, Daniel et al.
U.S. Appl. No. 11/208,723, filed Aug. 23, 2005, Tempel, Daniel et al.
U.S. Appl. No. 11/398,965, filed Apr. 6, 2006, Vladimir Yliy Gershtein et al.
U.S. Appl. No. 11/398,961, filed Apr. 6, 2006, Vladimir Yliy Gerwshtein et al.

* cited by examiner

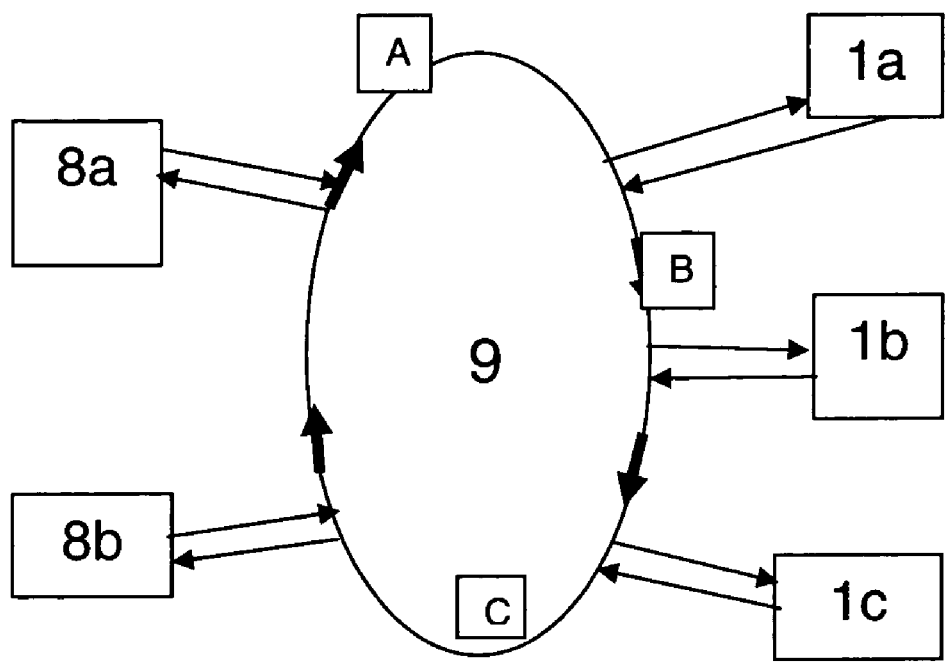
Figure 1. Schematic of efficient product delivery and spent return

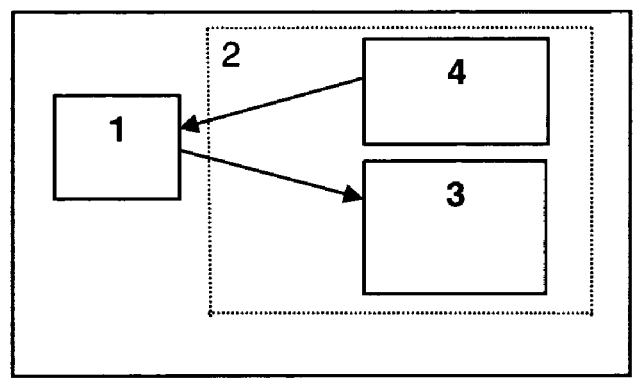
Figure 2 – Schematic of a fresh and spent loading/ unloading operation.

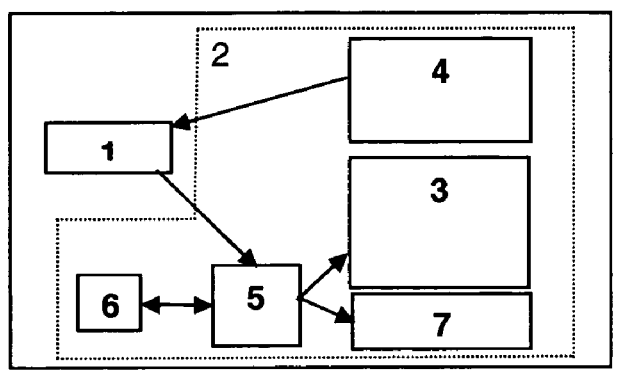
Figure 3  Schematic of a loading and unloading system at a refilling station

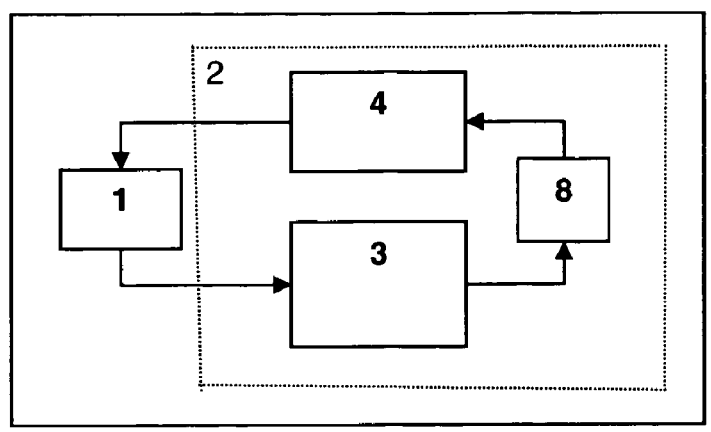
Figure 4. Schematic of a vehicle refueling process at a site with rehabilitation

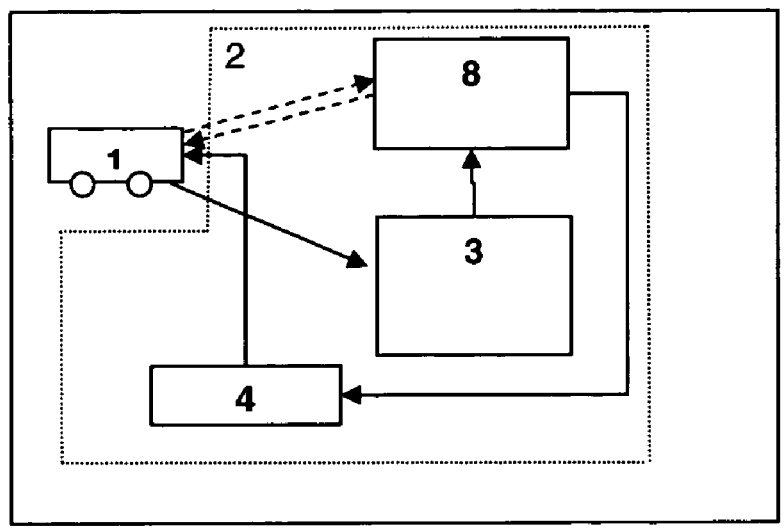
Figure 5. Schematic of an aspect of the process illustrated in Figure 3

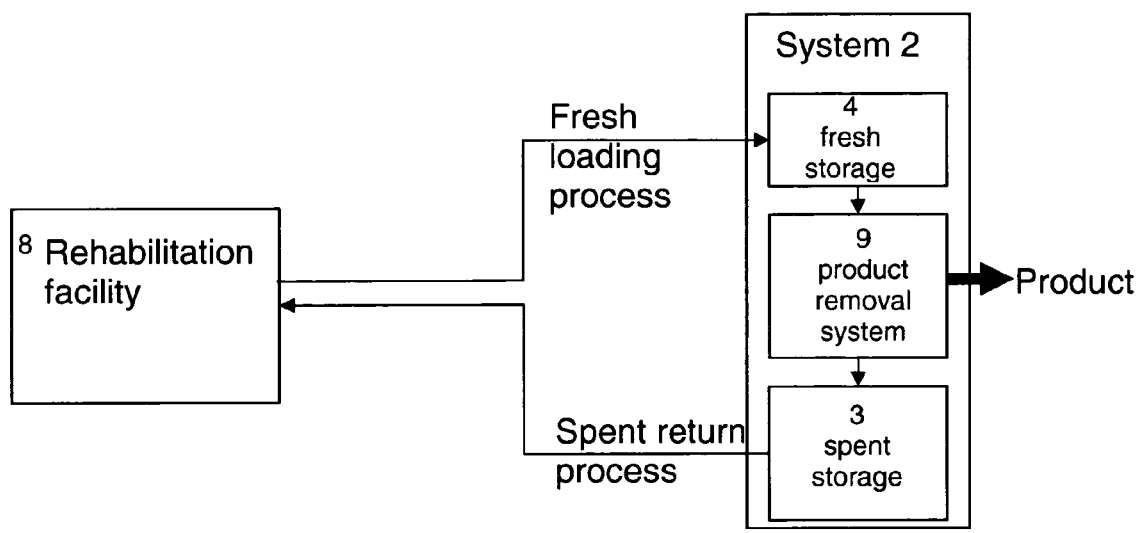
Figure 6. Schematic of a single carrier loop process

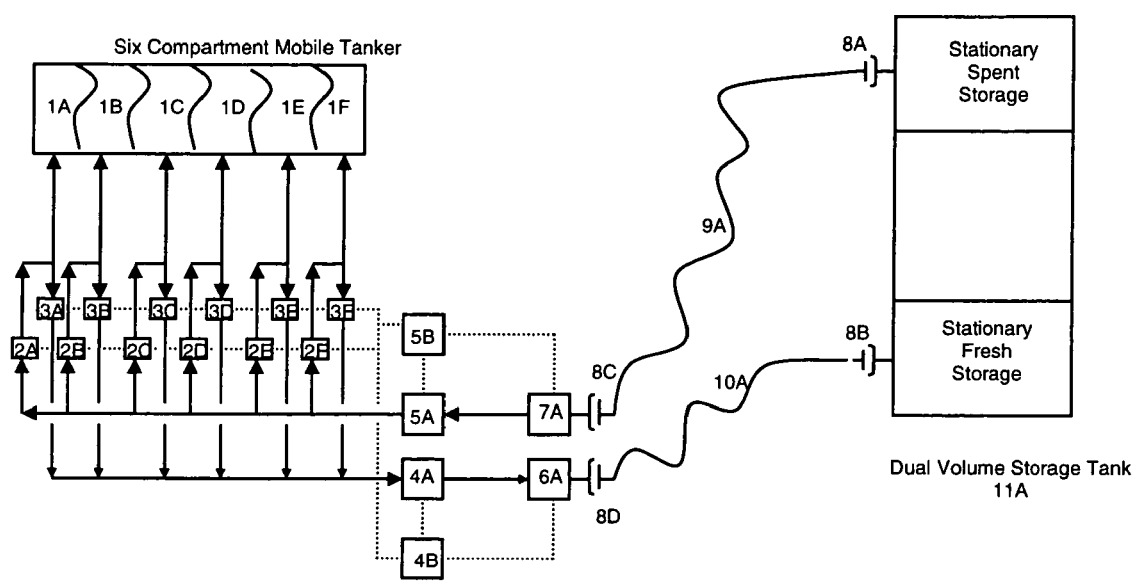
Figure 7. A schematic of fresh/spent mobile tanker system loading/unloading at a user site

EFFICIENT SYSTEM AND METHOD FOR DELIVERY OF PRODUCT AND RETURN OF CARRIER

CROSS-REFERENCE TO RELATED APPLICATIONS

This application claims the benefit of Provisional Application No. 60/669,522, filed on Apr. 8, 2005 and Application No. 60/707,036, filed on Aug. 10, 2005. The disclosure of the Provisional Application is hereby incorporated by reference.

The subject matter of the instant invention is related to the following commonly assigned Patents and patent application Ser. No. 10/430,246, filed May 6, 2003 and entitled "Hydrogen Storage by Reversible Hydrogenation of Pi-Conjugated Substrates" (now Publication No. US2004-0223907-A1); Ser. No. 10/833,467, filed Apr. 27, 2004 and entitled "Method of Delivering a Reversible Hydrogen Storage Fuel to a Mobile or Stationary Fuel Source"; and Ser. No. 10/833,484, filed Apr. 27, 2004 and entitled "Hydrogen Storage By Reversible Hydrogenation Of Pi-Conjugated Substrates"; U.S. patent application Ser. No. 11/398,965, filed of even date herewith and entitled "Secure Loop System and Method For Supply and Delivery of Product Contained in a Carrier"; and U.S. patent application Ser. No. 11/398,961, filed of even date herewith and entitled "Method and System of Supply and Delivery of Product Contained in a Carrier." The disclosure of these patents and patent applications is hereby incorporated by reference. These patents and patent applications disclose carrier, spent, fresh and products that can be used in accordance with the instant invention.

BACKGROUND OF THE INVENTION

The instant invention relates to a systems and methods for delivering, distributing, selling and exchanging carrier, product, fresh and spent. The carrier releasably incorporates at least one product. In one aspect of the invention, methods are provided for incorporating a product (e.g., an otherwise gaseous or unstable chemical product), such as hydrogen, within a carrier (i.e., fresh as defined herein), distributing fresh to a user, and recovering spent (i.e., comprising at least one dehydrogenated carrier) for rehabilitation, which may include regeneration.

By way of background, hydrogen-based fuel cells are viewed as a replacement for conventional means of generating electricity, and hydrogen is viewed as potential fuel substitution for conventional internal combustion engines (ICE). While such hydrogen-based systems are desirable, hydrogen supply, delivery, and storage may provide a number of technical challenges. A typical hydrogen delivery truck carries hydrogen at low cryogenic temperature and elevated pressure. One alternative method employs compressed gas. Compressed gas supply may be limited, for example, by storage capacity. Another alternative comprises sorbents, for example, metal hydride sorbents, which may not be sufficient for this usage due to weight constraints. There is a need in this art for method of providing product for fuel cells or ICE usage in an efficient and cost-effective manner. There is also a need in this art for methods that provides a simple, efficient, and low-cost transaction that can be implemented by all product customer groups, including but not limited to vehicle operators, filling stations, and other users.

Conventional methods and systems for distributing product are disclosed in Cohen, Joseph Perry and Copeman, Tama Maya, "Mobile hydrogen generation and supply system", U.S. Pat. No. 6,745,801B1, 8 Jun. 2004; Bradley, Keith, Kwon, Young-Kyun, Gruner, George, Wyatt, Jeff, Jhi, Seung-Hoon, Gabriel, Jean Christophe, "Hydrogen storage and supply system", U.S. Pat. No. 6,834,508B2, 28 Dec. 2004; Metsiger, Pierre, "Pharmaceutical Composition for Oral Delivery" Patent Application WO98/01118 and EP0862423A1, 15 Jan. 1998; Vickers, Michael T., Jianhua, Yan and Monson, Robert J., "Comprehensive Product Delivery System" Pat. Application WO9702898, 30 Jan. 1997; Chrai, Suggy S., Murari Ramaswamy, "Liquid Pharmaceutical for Oral Delivery" US Patent Application Publication No. US20030108601A1, 12 Jun. 2003; Moore, Howard F. and Shaffer, Jr., Arthur G in U.S. Pat. No. 6,402,938B1, "Vaporization of used motor oil with non-hydrogenating recycle vapor"; Kresnyak, Steve and Braun, Alex in U.S. Pat. No. 6,536,523B1, "Water treatment process for thermal heavy oil recovery" published on Mar. 25, 2003; and, YAMADA MASAO in JP2005009062A "WASTE PAPER FIBROUS MATERIAL UTILIZING SYSTEM AND WASTE PAPER DEFIBRATING MACHINE" published on Jan. 13, 2005. The disclosure of the previously identified patents and publications is hereby incorporated by reference.

However, none of the above references adequately solve the problems addressed by the present invention.

BRIEF SUMMARY OF THE INVENTION

The instant invention solves or avoids problems that arise when conventional methods are used for supplying chemical product. The invention provides a carrier that includes at least one chemical as a product, as well as systems and methods for releasing the product from the carrier to generate spent (as defined herein). The carrier can comprise a composition manufactured so as to include product, or a previously manufactured composition that is processed to incorporate product. The systems and methods further provide for collecting spent. The collected spent can be rehabilitated to provide a carrier that can be regenerated to provide fresh.

In one embodiment, the invention is a system for distributing a product releasably incorporated within a carrier, recovering spent, and conveying spent to a rehabilitation facility. In this embodiment, the system comprises a mobile delivery vehicle, the vehicle comprising a first storage vessel for storing fresh and for dispensing fresh using a connected fresh dispensing apparatus and for receiving and storing spent from a spent dispensing apparatus, the storage vessel further including means for separating fresh from spent. The system further includes fresh, spent, and a first user. The first user comprises a fresh storage vessel for receiving, storing, and dispensing fresh, and further comprises a first spent storage vessel for receiving, storing, and dispensing spent. The system further includes a fresh dispensing apparatus for linking the first storage vessel and the fresh storage vessel of the first user for dispensing of fresh to the first user, and a spent removal apparatus for linking the first storage vessel and the spent storage vessel of the first user for removal of fresh from the first user for storage in the first storage vessel.

In a second embodiment, the system also includes a rehabilitation facility for receiving spent from storage vessel of the mobile delivery vehicle and rehabilitating spent to form fresh. The system optionally further includes instrumentation means for detecting at least one chemical or physical property of fresh, product, spent, carrier, or any combination thereof.

In another embodiment, the invention provides methods for distributing a product incorporated into a carrier and for recovering spent. The method involves providing a system comprising a mobile delivery vehicle, the vehicle comprising a first storage vessel for storing fresh and for dispensing fresh using a connected fresh dispensing apparatus and for receiving and storing spent from a spent dispensing apparatus, the storage vessel further including means for separating fresh from spent. The system further includes fresh, spent, and a first user. The first user comprises a fresh storage vessel for receiving, storing, and dispensing fresh, and further comprises a first spent storage vessel for receiving, storing, and dispensing spent. The system further includes a fresh dispensing apparatus for linking the first storage vessel and the fresh storage vessel of the first user for dispensing of fresh to the first user, and a spent removal apparatus for linking the first storage vessel and the spent storage vessel of the first user for removal of fresh from the first user for storage in the first storage vessel. The system also includes a rehabilitation facility for receiving spent from storage vessel of the mobile delivery vehicle and rehabilitating spent to form fresh. The method requires connecting the first storage vessel of the mobile delivery vehicle to the fresh storage vessel of the first user using the fresh dispensing apparatus, and operating the fresh dispensing apparatus to dispense fresh from the first storage vessel of the mobile delivery vehicle into the fresh storage vessel of the first user. The method further involves connecting the first storage vessel of the delivery vehicle to the spent storage vessel of the first user using the spent removal apparatus, and operating the spent removal apparatus to remove fresh from the spent storage vessel of the first user for storage in the first storage vessel of the mobile delivery vehicle.

The instant systems and methods can be employed for delivering a carrier material with included product (fresh) such as hydrogen wherein the hydrogen can be released in a manner suitable for consumption such as in a fuel cell or an ICE (e.g., by a dehydrogenation reaction). Fresh has the ability to be processed so that it can release hydrogen thereby becoming spent. Spent then may be regenerated back into fresh by rehabilitation to contain hydrogen or its elements (e.g., hydrogen is removed from fresh and hydrogen is added to rehabilitate spent for reuse as fresh). A list of specific carriers capable of reversibly carrying, for example, hydrogen may be found in US patent applications US2004/0223907 and US2005/0002857 (hereby incorporated by reference), and may include but not limited to the following: perhydroindolo[3,2,1-jk]carbazole, perhydrodibenzofuran, dodecahydrobiphenylene, perhydro-N,N'-diethyl-bis-indolymethane, perhydro-N-ethylcarbazole, perhydro-N-methylcarbazole, and 10-methyl-10H-phenoxazine. The instant invention delivers and/or dispenses fresh while collecting spent. The presence of a carrier in both streams of delivered fresh and returned spent is addressed by the instant invention.

The inventive method and systems comprises exchanging at least a portion of fresh for at least a portion of spent on a substantially equal basis, and receiving compensation for a product delivered with fresh. By "substantially equal basis", it is meant that a defined amount of spent corresponds generally to a defined amount of fresh that is dispensed (e.g., into a reservoir of a vehicle). Such amounts may not be identical due to various reasons such as, for example, product withdrawal from fresh and possibly variations in delivery equipment in use, measurement devices, computer control systems or other losses associated with removing product from fresh, among other causes for variation. The inventive method and systems also comprise distributing carrier between the various carrier operational and distribution locations as well as to the user locations (e.g., from the carrier manufacturer and/or rehabiliation to a distribution station or to a filling station interface).

The following defined terms are used herein:

"Product" comprises any chemical that is capable of being releasably stored in a carrier. By way of non-limiting example, product may comprise hydrogen, fluorine, chlorine, oxygen, arsine, stibine, phosgene, methane, hydrogen fluoride, gases containing boron, phosphorus, aluminum, or silicon components, and combinations thereof. By way of further example, product may be incorporated into a carrier fully intact (such as $H_2$), and/or as elements of a product (such as H bound to another non-H molecule), so long as the elements can be reassembled to form product after release from a carrier.

"Carrier" comprises a substance or mixture of substances that is able to incorporate a product or product elements, and to release the product, thereby becoming fresh and spent reversibly. There may be different carriers for the same product, one carrier for multiple products, or different carriers for different products. By way of non-limiting examples, carrier may comprise one or more of organic compounds (e.g., ionic liquids, solvated compounds, among others)

"Fresh"—the carrier when it incorporates product or product elements.

"Spent"—the carrier when depleted or partially depleted of product or product elements. Spent may exhibit some similar chemical and/or physical properties as fresh and/or the carrier. However, spent will have at least one detectable chemical and/or physical difference when compared to fresh, such as, but not limited to, different phases, specific gravity, viscosity, density, vapor pressure, ignition point, miscibility, and other known chemical and/or physical properties.

"User" is any entity, person, or device capable of receiving at least one of fresh, spent, carrier, product, and product elements. By way of non-limiting example, a user may be a fuel cell, a combustion engine, filling station, industrial process, distribution system, or any other device or system.

"Regeneration" comprises any process that incorporates a carrier with a product or product elements. By way of non-limiting example, where a product is hydrogen, regeneration could be hydrogenation of an unsaturated organic carrier.

"Rehabilitation" comprises restoring spent into fresh. Rehabilitation may include product manufacture, carrier manufacture, regeneration, recycling, purification, analysis and testing, and other similar processes.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

FIG. 1 is a schematic of an efficient product fresh delivery and spent return involving multiple user sites and/or multiple rehabilitation sites.

FIG. 2 is a schematic of a fresh and spent loading/unloading operation.

FIG. 3 is a schematic of a loading and unloading system at a refilling station.

FIG. 4 is a schematic of a vehicle refueling process at a site with rehabilitation.

FIG. 5 is a schematic of an aspect of the process illustrated in FIG. 5.

FIG. 6 is a schematic of a single carrier loop process.

FIG. 7 is a schematic of fresh/spent system loading/unloading at a user site.

Numbering of the various elements in the figures is intended to maintain consistency of the description of the numbered elements, and to illustrate the interaction and potential interchangeability of some elements.

DETAILED DESCRIPTION OF THE INVENTION

The techniques described below are related to a method or system wherein a product (e.g., hydrogen), is contained in a carrier. In general, the carrier may be in any physical state such as a solid, liquid, vapor, plasma, or any combination of the above. The carrier can include at least one additive for modifying at least one chemical or physical property of the carrier (e.g., an additive to lower the freezing point of the carrier). In addition, the carrier may involve any suitable mechanism to capture, retain, or release product, for example, chemical reaction, absorption, adsorption, dissolution, dilution, those disclosed in the aforementioned commonly assigned Patents and Patent Applications, among other mechanisms. In general, the carrier is used to contain a product or product elements. The carrier with contained product or its elements (i.e. fresh), is used to store and/or transport the product. Fresh may be transported by using methods or equipment known in the art (e.g. ISO containers, cylinders, rail car containers, etc). Once product is removed, the product depleted carrier (i.e., spent), may be returned back for rehabilitation using the same or different equipment that is used for delivery of fresh. When rehabilitated, the carrier becomes fresh and is containing the product or its elements again. The entire operation and delivery system of carrier distribution should be conducted in a manner that is efficient and/or reduces the potential for contamination of carrier. For example, a purged connect/disconnect equipment may be used to prevent air from coming into the fresh or spent holding capacity in the case when air may be a contaminant to fresh, spent, or carrier. Devices such as, for example, isolation valves, caps, plugs, etc., may be used while the connecting ends are in transit or not in service to prevent contamination such as spider webs, bug remains, water, road dirt, etc. The primary product described herein is hydrogen; however, the various aspects described herein may be useful for other products that can be releasably incorporated into a carrier. While one desirable aspect of the invention relates to the ability to rehabilitate spent, if desired, the carrier (alone or with product) may have value in other applications, for example, the carrier can be used as fuel in an internal combustion engine (ICE).

A product enriched carrier (i.e., fresh), may be loaded onto a user (device), for example a vehicle, power generator, distribution facility, chemical processing system, among others (e.g. which are capable of separating carrier from product and consuming the product). As product is being consumed, spent is generated and may be stored in a storage capacity (e.g., a vessel associated with the vehicle and belonging to the user). The storage capacity may be the same or different from that for fresh. For example, in one embodiment, two separate storage vessels may be used, where one is used only for fresh and the other one is used only for spent. In the other embodiment, one vessel with a stationary separating wall may be used defining two separate compartments of said vessel. Each compartment may be dedicated to either fresh or spent. Yet in the other embodiment, one vessel with a moving divider may be used, wherein a divider may comprise at least one of: i) fixed dividers within the user storage vessel; ii) movable dividers within the user storage vessel; iii) a bladder within the user storage vessel; iv) chemical separation of fresh and spent based upon inherent or modified properties of each; and v) physical separation of fresh and spent based upon inherent or modified physical properties of each Spent may have to be removed and replaced by fresh once all or substantially all product capacity is consumed. Replacement of spent by fresh may take place during a refilling operation. The product separating device may continue functioning during and/or after the refilling operation is completed. There are different ways to exchange spent for fresh or regenerate spent. For example, rehabilitation of spent on board of a device (e.g., on board a vehicle), rehabilitation at a refilling site (e.g., onsite rehabilitation), spent is exchanged for fresh on a defined exchange basis, etc. In addition, the onsite rehabilitation unit may be stationary, mobile, or a combination of both. Also, the user may be stationary, for example, power generator, individual house or building, industrial applications; mobile, for example, vehicles with fuel cell, distribution trailer, etc.; or portable, for example, power tools, cell phones, computers with fuel cells, among other applications.

In general, product, fresh, and spent may be different molecules. That is, hydrogen incorporated into the carrier may form a completely different material or substance from what both were separately. One example of a product and carrier combination may be hydrogen, quinoline, perhydroquinoline, and 1,2,3,4-tetrahydroquinoline. Quinoline (e.g. spent) combined with hydrogen through hydrogenation may form perhydroquinoline (e.g. fresh). Through dehydrogenation to release product, partially dehydrogenated perhydroquinoline may become 1,2,3,4-tetrahydroquinoline (e.g. spent) or fully dehydrogenated quinoline (e.g. spent). Another example of a product and carrier combination may comprise hydrogen, sodium borate, and sodium borohydride. Sodium borate may be processed in a manner that may become sodium borohydride, for example with a process that may or may not include the direct combination of hydrogen gas. Hydrogen may be released from sodium borohydride in a reaction with water and a catalyst. A further example of a product and carrier combination may comprise phosphine and at least one ionic liquid, for example using 1,3-dimethylimidazolium as the cation and $Al_2Cl_7^-$ as the anion. Phosphine may be removed from the ionic liquid (fresh carrier) by applying a pressure differential to the fresh carrier, i.e. a vacuum. Additional examples of suitable ionic liquids are disclosed in U.S. patent application Ser. Nos. 10/948,277 and 11/208,723 entitled "Ionic Liquid Based Mixtures For Gas Storage And Delivery" (hereby incorporated by reference). The product can be rehabilitated or released from the carrier by: 1) exposure to at least one catalyst, 2) applying or removing energy, for example heat, 3) applying or removing pressure, 4) combining with at least one reactant, 5) combinations of the foregoing, among other process parameters. The product can be released from the carrier by exposure to a plurality of systems and methods. One example comprises exposing the carrier to a first method to release a portion of the product and thereafter exposing the carrier to a second method for releasing another portion of the product. The first and second methods can be the same method (e.g., conducted under different conditions) or distinct processes.

A potential presence of a carrier in both streams (i.e., delivered fresh and returned spent), presents new challenges, which have not been addressed in presently available supply and delivery logistics. For example, a vehicle stopped at a refilling station may have to exchange spent for fresh versus just receiving fuel such as, for example, gasoline. Examples of useful carriers and additional information regarding certain aspects of the embodiments described herein may be found in patent application Ser. No. 10/430,246 filed May 6, 2003; U.S. patent application Ser. No. 10/833,467 filed Apr. 27, 2004; and patent application Ser. No. 10/833,484 filed Apr. 27, 2005, all of which are incorporated in their entireties herein by reference.

Supply and delivery logistics may include loading and unloading of delivered carriers to the user, for example, via a distribution system. Manufacturing, rehabilitation, distribution, delivery, among other facilities or systems may have multiple sites where carrier should be supplied to and carrier should be collected from. Product supply and carrier distribution processes necessitate having an efficient system for carrier, fresh and/or spent delivery. A description of such an exemplary system is presented below.

As shown in FIG. 1, delivery means 9 supplies fresh from, for example, rehabilitation locations 8a and 8b to multiple users, for example, users 1a, 1b, 1c. Referring now to FIG. 1, delivery means 9 can be used to return spent from users 1a, 1b, and 1c back to rehabilitation locations 8a and 8b. Delivery means 9 may include means to contain and convey spent from and fresh to a given user without exposing another or subsequent user to contaminants. Coexistence of different carriers (e.g. spent and, fresh), within any carrier storage device such as the delivery means 9 may be achieved by using any suitable separation means. Examples of suitable separation means can comprise at least one of i) fixed dividers within the user storage vessel; ii) movable dividers within the user storage vessel; iii) a bladder within the user storage vessel; iv) chemical separation of fresh and spent based upon inherent or modified properties of each; and v) physical separation of fresh and spent based upon inherent or modified physical properties of each Spent may have to be removed and replaced by fresh once all or substantially all product capacity is consumed. The ability to hold fresh and spent within the same delivery means 9 may ensure capability of delivery means 9 to transfer fresh to, and remove spent from, any user or multiple users during the same routing trip.

A typical product delivery process is completed in one direction only from, for example, a manufacturer to the users. Such one direction product delivery processes are used either because a product may be fully consumed in the process and there is no product carrier involved to be returned for further circulation, or a product may be transformed into a form that is not usable in a product supply chain in the direct reversible logistics. Examples of one direction product delivery may include but not limited to gasoline delivery to fueling stations, industrial gases supply to chemical plants and electronics fabricators, lubrication oil delivery to oil changing stations, and the like. Return of packages, contaminated products, process residues, etc. may be required once delivered product is used in a desired process. Typically, such back delivery operations are related to a package return process as, for example, cylinders return in the case when industrial gases were delivered as a product, or contaminated oil return for recycle and reprocessing in refineries.

The instant invention provides a means to keep the fresh and spent separate in examples where spent may be a contaminant for fresh, constituting an improvement over the prior art example wherein a waste oil product is returned for reuse. An exemplary carrier (e.g., fresh/spent) delivery system and method is described below.

In one exemplary aspect of the invention, the delivery means is associated with the carrier (fresh and spent) in such a way that product delivery, carrier transfer, and carrier transportation delivery is achieved. Delivery means can comprise at least one of a pipeline, mobile transportation system such as a truck or barge, among other suitable means. The carrier is contained within the delivery means so that when a quantity of fresh carrier is transferred at a location, a substantially equal amount of spent carrier is transferred. Transferring means for a carrier can comprise any suitable device capable of transferring a carrier from one entity to another entity. While any suitable transferring means can be used, examples of components of transferring device include pipeline, hose, nozzle, or dispenser. This system and process is illustrated by considering different transportation points A, B, C depicted in FIG. 1 in conjunction with the volumes, weights, and densities of typical fresh, spent, and product components as exemplified in Table 1.

Referring to Table 1, the exemplary carrier can be either N-ethylcarbazole or Quinoline and the exemplary product is hydrogen. The following experimental data was used to generate Table 1: Density measurements conducted with a carrier comprising hydrogenated Quinoline show that density may vary by as much as 10% increasing when the contained hydrogen level is decreasing. For example, density of spent comprising Quinoline was measured at 1.093 g/cc. When Quinoline is fully hydrogenated, it (as a carrier) becomes fresh comprising Perhydroquinoline with measured density of 0.933 g/cc and carrier that is only partially spent becomes, for example, 1,2,3,4-Tetrahydroquinoline with measured density of 1.061 g/cc. For example, the spent volume may be about 80-85% of the fresh volume as it was measured during the lab experiments with the spent carriers Quinoline and N-ethylcarbazole. Hydrogen capacity of 5.7 wt. % was measured in N-ethylcarbazole when the latter was hydrogenated at 160° C. and 800 psia $H_2$ pressure and dehydrogenated at 180° C. and 15 psia $H_2$ pressure.

In Table 1, at point A the tanker is completely filled with fresh carrier, such as after dispensing a full load of spent and receiving a full load of fresh from a rehabilitation facility. The tanker includes multiple compartments and each is filled with 100% fresh carrier. The overall volume of fresh in the tanker is 3,000 gallons (401 ft3); the weight of 3000 gallons of fresh is 23,298 lbs using a density of 58.1 lbs/ft3.

At point B the tanker has dispensed a load of 500 gallons of fresh at a user location, bringing the overall available fresh on the tanker to 2,500 gallons weighing 19,405 lbs. At the same user location, whether simultaneously, parallel or subsequently, the tanker receives a substantially equal amount (e.g., equal product carrying amount) of spent, 425 gallons, weighing 3,882 lbs based on the spent density of 68.1 lb/ft3. After the loading and unloading occur, the tanker will have 2,500 gallons of fresh and 425 gallons of spent. Substantially equal product carrying capacity in this case represents 500 gallons of fresh and 425 gallons of spent that were exchanged. That is, once the 425 gallons of spent is regenerated, it will become approximately 500 gallons of fresh. In addition to the difference based on the removal of the hydrogen, the volume and density difference between fresh and spent is dependent on physical and chemical characteristics of the carrier and these values may vary for different carriers.

At point C in Table 1 the tanker is substantially completely empty of fresh (0 gallons) and contains a full load of spent (e.g., a tanker having a capacity of 3,000 gallons contains 2550 gallons of spent). That is, the tanker has a substantially equal product carrying amount to the initial fresh load. The weight of spent in the tanker is now 23,222 lbs. Since the fresh is substantially completely dispensed at this point, the product contained therein is no longer in the tanker and thus a value of 0 lbs is shown in the Table. The tanker delivered fresh to several user locations and at each of those locations picked up a substantially equal product carrying amount of spent. The product was delivered with fresh.

In other embodiments, the user may be of a different nature, for example, fuel cell vehicle, power generation, refilling station, carrying means, industrial processes, and other known devices requiring product for use. Any user may be stationary or mobile. This same cycle of dispensing fresh and returning spent may occur at any of the distribution and/or delivery points in the supply chain. The exchange on substantially equal basis of fresh and spent may be desired at each supply chain delivery point to create an efficient delivery and distribution system and thus enabling effective usage of the carrier.

FIG. 3 may also need a delivery means for spent waste in Tank 7. The facilites illustrated in FIGS. 2-5 can comprise users 1a, 1b and/or 1c.

Delivery means 9 can be designed and provided in any of several ways. For example, a mobile delivery vehicle such as a tanker, rail car, ISO container, etc., which are capable of transporting liquid, solid, and/or gaseous chemicals, may have rigidly defined sections or compartments where spent and fresh may be separated during delivery cycle. In addition, delivery means, for example, container may have an elastic bladder or movable wall one in each compartment if it is a

TABLE 1

Example of efficient fresh and spent loading/unloading process with multiple users.

|  | Fresh A | Fresh B | Fresh C | Spent A | Spent B | Spent C | Product A | Product B | Product C |
|---|---|---|---|---|---|---|---|---|---|
| Volume |  |  |  |  |  |  |  |  |  |
| gals | 3,000 | 2,500 | 0 | 0 | 425 | 2,550 | Part of Fresh A | Part of Fresh B | 0 |
| ft3 | 401 | 334 | 0 | 0 | 57 | 341 |  |  | 0 |
| m3 | 11.35 | 9.45 | 0 | 0 | 1.61 | 9.65 |  |  | 0 |
| Weight |  |  |  |  |  |  |  |  |  |
| lbs | 23,298 | 19,405 | 0 | 0 | 3,882 | 23,222 | 1,328 | 1,106 | 0 |
| kg | 10,577 | 8,810 | 0 | 0 | 1,762 | 10,543 | 603 | 502 | 0 |
| Density |  |  |  |  |  |  |  |  |  |
| lbs/ft3 | 58.1 | 58.1 | 58.1 | 68.1 | 68.1 | 68.1 | Part of Fresh A | Part of Fresh A | Part of Fresh A |
| gm/cm3 | 0.933 | 0.933 | 0.933 | 1.093 | 1.093 | 1.093 |  |  |  |

Delivery means 9 with fresh received from rehabilitation location 8a and/or 8b delivers fresh to multiple users, for example, to users 1a, 1b, and 1c as shown in FIG. 1. Delivery means 9 transfers fresh at each location, for example, sequentially. Simultaneously, delivery means 9 may receive spent, for example, while the unloading process is in progress and/or after the unloading process is completed, etc. Therefore, delivery means 9 may contain different quantities of both fresh and spent at the same time. Spent received by delivery means 9 may be carried back to rehabilitation location 8a and/or 8b. Therefore, both fresh delivery and spent return processes are simplified and become more effective. Delivering means of carrier may be accomplished through any device or vehicle capable of transporting a carrier between locations, for example users, rehabilitation, manufacturing, or waste collection. from one entity to another entity. Non-limiting examples of delivering means include pipeline or vehicle whether truck, ship, plane, rail car, or other vehicle. For example, one stop at each location, and one routing trip between locations is all that may be required to carry fresh and spent back and forth between, for example, rehabilitation location 8a and/or 8b and users 1a, 1b, and 1c. This supply and delivery process may be used for any supply and delivery cases when a product is contained in a carrier and the carrier may need to be returned for rehabilitation, for example, to a carrier regeneration or rehabilitation location, intermediate distribution locations, intermediate spent storage facilities (e.g., as shown in FIGS. 2 thru 7). For example, the facilities illustrated in FIGS. 2, 3, 7 show a single user that may need a delivery means for carrier to a rehabilitation facility. The facilities illustrated in 4 and 5 may need a delivery means for carrier if the onsite rehabilitation is not operational for example if it requires repair or maintenance. The facility in compartmented container or one for a full container if it is a non-compartmented one. Examples of useful designs are disclosed in U.S. Pat. No. 6,802,875B1, EP1081780A2, U.S. Pat. No. 6,382,264B1 and WO03061047A1, incorporated in their entireties herein by reference. The use of bladder type separation or movable wall concept may allow for a dynamic volume change of a single volume (compartment). Yet in another embodiment, one vessel with a moving divider may be used, wherein a divider may comprise at least one of: i) fixed dividers within the user storage vessel; ii) movable dividers within the user storage vessel; iii) a bladder within the user storage vessel; iv) chemical separation of fresh and spent based upon inherent or modified properties of each; and v) physical separation of fresh and spent based upon inherent or modified physical properties of each In addition, in some instances, it may be desirable for spent and fresh to be mixed together for transport and storage, and later separated for delivery and use due to chemical or physical properties of each, for example, density difference. In this specific example, assuming that spent is lighter than fresh, fresh can be retrieved from the bottom of a storage tank when spent may be filled from the top of the same storage tank, with or without a divider in between.

The following embodiment provides for handling and transporting carrier, (e.g. fresh and spent) between two or more locations, for example, rehabilitation and distribution locations. Delivery means 9, for example, a tanker, rail car, ISO container, or the like, may start its journey being completely loaded with fresh, i.e. carrying maximum allowable load of fresh, which translates into favorable economics and high system efficiency. Delivery means 9 may contain substantially only spent at the end of its journey as a result of unloading fresh and receiving spent. The exchange of fresh for spent may be done in many different ways, for example, exchange on a substantially equal basis criteria such as mass, volume, contained product capacity, etc. Delivery means 9 may be loaded and unloaded at one or more locations, and may be done simultaneously. Spent may be carried to, for example, rehabilitation sites 8 once delivery means 9 have exchanged all or substantially all initially loaded fresh for spent.

Alternatively, delivery means 9 does not have to be loaded and unloaded on substantially equal basis. For example, it may receive more spent then delivered fresh. Delivery means 9 may not be able to efficiently accommodate the return of more spent than delivered fresh, for example, because the means might require more volume than delivery means 9 for delivered fresh for a single spent transport. Also, the latter process is more susceptible to potential fraud especially if a product carrier has separate substantial value as, for example, product itself. To resist fraud, the fresh/spent reloading procedure at user sites is preferably completed on substantially equal basis only. Appropriate instrumentation, procedures, and/or techniques such as, for example, flow meters, weight scales, ID readers, database, calculations, software, algorithms, etc. may be used. Carrier can be analyzed by instrumentation means, such as but not limited to viscometers, conductivity and density measuring devices, chemical analyzers, gas analyzers, chromatographs, ultraviolet/visible sensors (UV/Vis), light and infrared light (IR) sensors, microwave sensors, nuclear magnetic resonance (NMR) spectroscopy, magnetic susceptibility, and laser technology, and the like, before the contents of tank 5 are transferred further. For example, analysis based on viscosity measurements were shown feasible to implement as fresh/spent quality control measures. It was demonstrated that a carrier viscosity, light absorption properties, etc., may change during hydrogenation/dehydrogenation cycle. For example, the viscosity of perhydro-N-ethylcarbazole increases 7.4 times as it is dehydrogenated. All numbers measured using a Brookfield dynamic viscometer with #2 spindle at 100 rpm were as follows: Perhydro-N-ethylcarbazole 13.5 centipoise and Tetrahydro-N-ethylcarbazole 100 centipoise. Such a difference in viscosity allows generation of a fresh/spent control curve for fresh/spent quality analysis. In another example, hydrogenated N-ethylcarbazole, IR can be used to identify the formation of dehydrogenated N-ethylcarbazole. There are multiple bands related to aromatic C—H bending at 1230, 747, and 721 $cm^{-1}$. Yet in another example, for hydrogenated N-ethylcarbazole, UV/Vis can be used to identify the formation of dehydrogenated N-ethylcarbazole. The $\pi \rightarrow \pi^*$ transition at 270 nm is absent in perhydro-N-ethylcarbazole and grows as aromatic intermediates form and is strongest when fully dehydrogenated to N-ethylcarbazole. A calibration could be set up to quantify the amount of dehydrogenation based upon the intensity of this band.

That being said, there may be some instances when it may be advantages to exchange carrier (e.g. spent and fresh) on not equal bases. Examples of such instances may include refilling facility expansion, accidental carrier loss, facility going out of business, etc. In these instances, an efficient delivery system of fresh and spent may permit specialized deliveries to complete an unequal exchange, i.e. load more or entirely spent or unload more or entirely fresh. By way of further example, additional fresh may be requested by the user.

The operations and systems of the instant invention may be manual, automated and combinations thereof. The operations and systems may include data collection and/or data use for, as example, identification, measurement, and other uses.

The loading unloading operations described here may be manual, automated, or any combination thereof. In addition, the systems, like, analytical equipment and related logic control systems may include data collection and/or data use for, as previously described. The system also may be operated in manual, automated, or any combination mode.

Several devices are listed and shown schematically in FIG. 8 to illustrate an example of a system which includes fresh/spent transportation, carrier movement, and fresh/spent transfer to ensure efficient product delivery, further to the various scenarios as described herein.

By way of non-limiting example, referring now to FIG. 8, FIG. 8 shows an example of a system and method for unloading fresh and loading spent onto delivery means 9, here a mobile tanker system communicably linked to a user, here a storage site. The tanker is dispensing fresh and receiving spent from stationary, dual-volume storage tanks 11A. The mobile tanker is capable of transporting, dispensing, and receiving combinations of fresh and spent from 0 to 100%. Compartments 1A, 1B, 1C, 1D, 1E, and 1F can be used for holding and transporting fresh and spent. Automatic control devices 3A, 3B, 3C, 3D, 3E, 3F, 2A, 2B, 2C, 2D, 2E, and 2F are used to direct flow of fresh or spent to and from the designated compartments. Devices 4A and 5A measure the amount of spent or fresh being dispensed or being returned. These measurement devices provide information to linked controllers, such as microprocessor controlled computers 4B and 5B. These controllers and any associated computers will run computer-executable code ("software") programs to allow the transfers of spent and fresh to occur in a number of different modes. For example one mode may be to transfer fresh and receive spent in a substantially equal manner based on the product carrying capacity of the carrier. Algorithms run by the software will be used to provide control outputs to automatic control valves 3A, 3B, 3C, 3D, 3E, 3F, 2A, 2B, 2C, 2D, 2E and 2F; and fresh/spent transfer pumps 6A and 7A respectively. 8A, 8B, 8C, and 8D represent disconnect/connect devices needed to temporarily connect the flexible hoses 9A and 10A to the stationary spent and fresh storage tanks, respectively. The system and controls shown can be a part of the mobile tanker, the stationary facility, or both. The stationary facility can be a refilling station, rehabilitation plant, distribution station or any other facility with fresh and spent storage. In general, the components in the system can vary in quantity and type based on the number of storage compartments. The figures illustrate preferred devices within a system that enable the invention of delivering fresh and receiving spent in a delivery and distribution system involving delivery means such as a mobile tanker, user sites with fresh and spent storage, and a rehabilitation facility. Alternatively, the mobile tanker could comprise a stationary facility or unit, and/or at least one of the spent storage or fresh storage could be mobile or otherwise transferable.

The aspects of the invention illustrated in FIGS. 1-7 can be used alone or in combination with other aspects of the invention. For example, the aspects illustrated in FIG. 7 can be used in combination with the aspect illustrated in FIG. 3, and the aspect illustrated in FIG. 1 can be used in the aspects illustrated in FIGS. 2, 3, 4, 5, 6, and 7. Further, components or systems from one figure can be used to replace or supplement components or systems of another figure.

While the above description emphasizes using fresh for delivering product for certain applications, the instant invention can be employed for delivering a suitable product for a wide range of end uses such as but not limited to power generator, individual house or building, industrial applications; mobile, for example, vehicles with fuel cell, distribution trailer, energy supply systems, energy consumers such as power generation plants and manufacturing facilities, recharging stations and systems such as, for example, for battery recharging purposes, power tools, cell phones, computers with fuel cells, among other applications.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for distributing a product releasably incorporated within a carrier to a user, and for recovering spent from a user, the system comprising:
   a mobile delivery vehicle, the vehicle comprising a first storage vessel for receiving and storing fresh from a fresh delivery means, and for receiving and storing spent from a spent delivery means, the storage vessel including means for separating fresh from spent;
   a first user, the first user comprising a fresh storage vessel for receiving, storing, and delivering fresh, and further comprising a first spent storage vessel for receiving, storing, and delivering of spent;
   a fresh transferring means for linking the first storage vessel and the fresh storage vessel of the first user for transferring fresh to the first user;
   a spent transferring means for linking the first storage vessel and the spent storage vessel of the first user for transferring spent from the first user,
   a second user, the second user comprising a second fresh storage vessel for receiving and delivering fresh from the mobile delivery vehicle, and further comprising a second spent storage vessel for receiving, storing, and delivering spent to the mobile delivery vehicle;
   a contamination storage vessel, an intermediate spent storage vessel wherein the intermediate spent storage vessel is disposed in the communicable connection between the spent removal apparatus and the spent storage vessel, wherein the intermediate spent storage vessel further includes a controllable communicable connection for selective transfer of spent from the intermediate storage vessel to the contamination storage vessel or the spent storage vessel; and,
   wherein the fresh transferring means and spent transferring means are controlled so as to load fresh onto and remove spent from the user on a substantially equal exchange basis.

2. The system of claim 1, wherein the mobile delivery vehicle further comprises:
   mobile delivery means for transporting fresh, spent, carrier, product, and combinations thereof to the second user,
   means for separating spent and fresh with the first user and the second user; and
   means for delivering exchanged spent to a rehabilitation facility.

3. The system of claim 2, wherein the means for separating fresh from spent comprises at least one member selected from the group consisting of: fixed dividers; movable dividers; a bladder; chemical separation of fresh and spent based upon inherent or modified properties of each; physical separation of fresh and spent based upon inherent or modified physical properties of each; and a plurality of dedicated compartments for each of fresh and spent.

4. The system of claim 1 wherein the system further includes means for delivering spent to a rehabilitation facility.

5. The system of claim 4, wherein the means for delivering spent to a rehabilitation facility comprises at least one member selected from the group consisting of: a direct connection to a rehabilitation facility; a spent dispensing apparatus capable of connection to a mobile rehabilitation facility; and a spent dispensing apparatus capable of connection to a mobile storage vessel for transport to a remote rehabilitation facility.

6. The system of claim 1, further comprising means for detecting at least one chemical or physical property of fresh, product, spent, carrier, or any combination thereof.

7. The system of claim 6, wherein the detecting means comprises at least one member selected from the group consisting of: viscometers, conductivity and density measuring devices, chemical analyzers, gas analyzers, chromatographs, ultraviolet/visible sensors (UV/Vis), light and infrared light (IR) sensors, microwave sensors, and combinations thereof.

8. The system of claim 1, wherein the product comprises at least one member selected from the group consisting of hydrogen, fluorine, chlorine, oxygen, arsine, stibine, phosgene, methane, hydrogen fluoride, gases containing boron, phosphorus, aluminum, or silicon components, and combinations thereof.

9. The system of claim 1 wherein the carrier comprises at least one ionic liquid.

10. The system of claim 1, wherein the product comprises hydrogen, wherein the carrier comprises at least one dehydrogenated organic chemical, wherein fresh comprises at least one hydrogenated derivative of the organic chemical, and wherein spent comprises at least one at least partially dehydrogenated derivative of the fresh.

11. A system for distributing a product releasably incorporated within a carrier to a user, and for recovering spent from the user, the system comprising:
   a mobile delivery vehicle, the vehicle comprising a first storage vessel for receiving and storing fresh from a fresh delivery means, and for receiving and storing spent from a spent delivery means, the storage vessel including means for separating fresh from spent;
   a first user, the first user comprising a fresh storage vessel for receiving, storing, and delivering fresh, and further comprising a first spent storage vessel for receiving, storing, and delivering spent;
   a fresh transferring means for linking the first storage vessel and the fresh storage vessel of the first user for transferring fresh to the first user;
   a spent transferring means for linking the first storage vessel and the spent storage vessel of the first user for transferring fresh from the first user; and
   a rehabilitation facility for receiving spent from the mobile delivery vehicle and rehabilitating spent to form fresh;
   a second user, the second user comprising a second fresh storage vessel for receiving and delivering fresh from the mobile delivery vehicle, and further comprising a second spent storage vessel for receiving, storing, and delivering spent to the mobile delivery vehicle; and,
   a contamination storage vessel, an intermediate spent storage vessel wherein the intermediate spent storage vessel is disposed in the communicable connection between the spent removal apparatus and the spent storage vessel, wherein the intermediate spent storage vessel further includes a controllable communicable connection for selective transfer of spent from the intermediate storage vessel to the contamination storage vessel or the spent storage vessel.

12. The system of claim 11, further comprising means for detecting at least one chemical or physical property of fresh, product, spent, carrier, or any combination thereof.

13. The system of claim 12, wherein the detecting means comprise at least one member selected from the group consisting of: viscometers, conductivity and density measuring devices, chemical analyzers, gas analyzers, chromatographs, ultraviolet/visible sensors (UV/Vis), light and infrared light (IR) sensors, microwave sensors, nuclear magnetic resonance (NMR) spectroscopy, magnetic susceptibility, and laser technology, and combinations thereof.

14. The system of claim 11, wherein the product comprises at least one member selected from the group consisting of hydrogen, the spent comprises at least one dehydrogenated organic chemical, and wherein the means for rehabilitating spent into fresh comprise hydrogenation means for hydrogenating the spent to form fresh.

15. A system for distributing a product releasably incorporated within a carrier to a user, and for recovering spent from a user, the system comprising:
- a mobile delivery vehicle, the vehicle comprising a first storage vessel for receiving and storing fresh from a fresh delivery means, and for receiving and storing spent from a spent delivery means, the storage vessel comprises means for separating fresh from spent;
- a first user, the first user comprising a user storage vessel for receiving, storing, and delivering fresh, and for receiving, storing, and delivering of spent wherein the user storage vessel comprises means for separating fresh from spent;
- a fresh transferring means for linking the first storage vessel and the user storage vessel of the first user for transferring fresh to the first user; and
- a spent transferring means for linking the first storage vessel and the user storage vessel of the first user for transferring spent from the first user; and,
- a contamination storage vessel, an intermediate spent storage vessel wherein the intermediate spent storage vessel is disposed in the communicable connection between a spent removal apparatus and a spent storage vessel, wherein the intermediate spent storage vessel further includes a controllable communicable connection for selective transfer of spent from the intermediate storage vessel to the contamination storage vessel or the spent storage vessel.

16. A system for distributing a product releasably incorporated within a carrier to a user, and for recovering spent from a user, the system comprising:
- a mobile delivery vehicle, the vehicle comprising a first storage vessel for receiving and storing fresh from a fresh delivery means, and for receiving and storing spent from a spent delivery means, wherein storage vessel comprises means for separating fresh from spent;
- a first user, the first user comprising a user storage vessel for receiving, storing, and delivering fresh, and for receiving, storing, and delivering spent; wherein the user storage vessel comprises means for separating fresh from spent;
- a transferring means for linking the first storage vessel and the user storage vessel for transferring fresh to the first user, and for transferring spent from the first user; and,
- a contamination storage vessel, an intermediate spent storage vessel wherein the intermediate spent storage vessel is disposed in the communicable connection between the spent removal apparatus and the spent storage vessel, wherein the intermediate spent storage vessel further includes a controllable communicable connection for selective transfer of spent from the intermediate storage vessel to the contamination storage vessel or the spent storage vessel.

* * * * *